(12) United States Patent
Suchowski et al.

(10) Patent No.: US 8,566,939 B2
(45) Date of Patent: Oct. 22, 2013

(54) METHOD AND DEVICE FOR SCANNING A PLURALITY OF COMPUTERIZED DEVICES CONNECTED TO A NETWORK

(75) Inventors: Ron Shay Suchowski, Raanana (IL); Hilik Kotler, Holon (IL)

(73) Assignee: Promisec Ltd., Tel Aviv (IL)

( * ) Notice: Subject to any disclaimer, the term of this patent is extended or adjusted under 35 U.S.C. 154(b) by 702 days.

(21) Appl. No.: 11/396,602

(22) Filed: Apr. 4, 2006

(65) Prior Publication Data

US 2006/0184682 A1     Aug. 17, 2006

Related U.S. Application Data

(63) Continuation-in-part of application No. 11/226,451, filed on Sep. 15, 2005.

(60) Provisional application No. 60/672,050, filed on Apr. 18, 2005, provisional application No. 60/672,072, filed on Apr. 18, 2005, provisional application No. 60/672,045, filed on Apr. 18, 2005, provisional application No. 60/672,046, filed on Apr. 18, 2005.

(30) Foreign Application Priority Data

Oct. 4, 2004    (IL) .......................................... 164402

(51) Int. Cl.
    *G06F 11/00*    (2006.01)
    *G06F 12/14*    (2006.01)
    *G06F 12/16*    (2006.01)

(52) U.S. Cl.
    USPC .......................................................... 726/23

(58) Field of Classification Search
    USPC .......................................................... 726/23
    See application file for complete search history.

(56) References Cited

U.S. PATENT DOCUMENTS

| 5,050,213 A | 9/1991 | Shear |
| 5,163,147 A | 11/1992 | Orita |

(Continued)

FOREIGN PATENT DOCUMENTS

| JP | 08-185315 A | 7/1996 |
| JP | 11-039157 A | 2/1999 |

(Continued)

OTHER PUBLICATIONS

Microsoft, "Windows 2000 Services", Accessed Feb. 28, 2012, http://technet.microsoft.com/en-us/library/bb742605.aspx, Jul. 1, 2001.

(Continued)

*Primary Examiner* — Kambiz Zand
*Assistant Examiner* — Stephen Sanders
(74) *Attorney, Agent, or Firm* — Browdy and Neimark, PLLC

(57) ABSTRACT

Some embodiments of the invention relate to a method and a device for scanning a plurality of computerized devices connected to a network. According to some embodiments of the invention, a plurality of computerize devices to be scanned may be provided. A plurality of threads of an agentless module may be provided for scanning the plurality of computerized devices. Each of the plurality of threads of the agentless module may be associated with at least one of the plurality of computerized devices. The plurality of threads of the agentless module may be utilized to configure a plurality of remote access processes to scan in parallel and without using agents at least two of the plurality of remote computerized devices.

49 Claims, 5 Drawing Sheets

(56) References Cited

U.S. PATENT DOCUMENTS

| | | | |
|---|---|---|---|
| 5,251,294 A | 10/1993 | Abelow | |
| 5,361,359 A | 11/1994 | Tajalli et al. | |
| 5,604,800 A | 2/1997 | Johnson et al. | |
| 5,610,981 A | 3/1997 | Mooney et al. | |
| 5,694,472 A | 12/1997 | Johnson et al. | |
| 5,696,822 A | 12/1997 | Nachenberg | |
| 5,778,068 A | 7/1998 | Johnson et al. | |
| 5,812,668 A | 9/1998 | Weber | |
| 5,828,840 A | 10/1998 | Cowan et al. | |
| 5,859,966 A | 1/1999 | Hayman et al. | |
| 5,878,210 A | 3/1999 | Kong | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,941,947 A | 8/1999 | Brown et al. | |
| 5,943,422 A | 8/1999 | Van Wie et al. | |
| 5,943,424 A | 8/1999 | Berger et al. | |
| 5,949,876 A | 9/1999 | Ginter et al. | |
| 5,963,621 A | 10/1999 | Dimolitsas et al. | |
| 5,964,889 A | 10/1999 | Nachenberg | |
| 5,991,735 A | 11/1999 | Gerace | |
| 6,006,328 A | 12/1999 | Drake | |
| 6,026,379 A | 2/2000 | Haller et al. | |
| 6,088,799 A | 7/2000 | Morgan et al. | |
| 6,138,119 A | 10/2000 | Hall et al. | |
| 6,151,606 A | 11/2000 | Mendez | |
| 6,158,010 A | 12/2000 | Moriconi et al. | |
| 6,185,683 B1 | 2/2001 | Ginter et al. | |
| 6,237,786 B1 | 5/2001 | Ginter et al. | |
| 6,253,027 B1 | 6/2001 | Weber et al. | |
| 6,253,193 B1 | 6/2001 | Ginter et al. | |
| 6,266,773 B1 | 7/2001 | Kisor et al. | |
| 6,282,546 B1 | 8/2001 | Gleichauf et al. | |
| 6,292,569 B1 | 9/2001 | Shear et al. | |
| 6,295,639 B1 | 9/2001 | Van Der Meer | |
| 6,298,445 B1 | 10/2001 | Shostack et al. | |
| 6,304,915 B1 | 10/2001 | Nguyen et al. | |
| 6,334,189 B1 | 12/2001 | Granger et al. | |
| 6,336,135 B1 | 1/2002 | Niblett et al. | |
| 6,366,967 B1 | 4/2002 | Wagner | |
| 6,381,589 B1 | 4/2002 | Leon | |
| 6,400,996 B1 | 6/2002 | Hoffberg et al. | |
| 6,418,424 B1 | 7/2002 | Hoffberg et al. | |
| 6,427,140 B1 | 7/2002 | Ginter et al. | |
| 6,553,412 B1 | 4/2003 | Kloba et al. | |
| 6,574,737 B1 * | 6/2003 | Kingsford et al. | 726/25 |
| 6,587,836 B1 | 7/2003 | Ahlberg et al. | |
| 6,618,806 B1 | 9/2003 | Brown et al. | |
| 6,625,150 B1 | 9/2003 | Yu | |
| 6,636,975 B1 | 10/2003 | Khidekel et al. | |
| 6,640,229 B1 | 10/2003 | Gilmour et al. | |
| 6,647,384 B2 | 11/2003 | Gilmour | |
| 6,658,464 B2 | 12/2003 | Reisman | |
| 6,671,813 B2 | 12/2003 | Ananda | |
| 6,687,375 B1 | 2/2004 | Matyas, Jr. et al. | |
| 6,714,962 B1 | 3/2004 | Helland et al. | |
| 6,725,382 B1 | 4/2004 | Thompson et al. | |
| 6,751,626 B2 | 6/2004 | Brown et al. | |
| 6,779,120 B1 | 8/2004 | Valente et al. | |
| 7,231,637 B1 | 6/2007 | McEwan | |
| 7,346,929 B1 * | 3/2008 | Hammond | 726/25 |
| 7,353,539 B2 | 4/2008 | Brawn et al. | |
| 7,581,249 B2 | 8/2009 | Bussiere et al. | |
| 2002/0026605 A1 * | 2/2002 | Terry | 714/37 |
| 2002/0143921 A1 | 10/2002 | Stephan | |
| 2003/0014636 A1 | 1/2003 | Ahlbrand | |
| 2003/0041243 A1 | 2/2003 | Olguin et al. | |
| 2003/0188194 A1 | 10/2003 | Currie et al. | |
| 2003/0200308 A1 | 10/2003 | Tameda et al. | |
| 2003/0212779 A1 | 11/2003 | Boyter et al. | |
| 2004/0000326 A1 | 1/2004 | Ziemins | |
| 2004/0088581 A1 | 5/2004 | Brawn et al. | |
| 2004/0123157 A1 | 6/2004 | Alagna et al. | |
| 2004/0128252 A1 | 7/2004 | Shirai et al. | |
| 2004/0250112 A1 | 12/2004 | Valente et al. | |
| 2005/0097199 A1 * | 5/2005 | Woodard et al. | 709/223 |
| 2005/0193427 A1 | 9/2005 | John | |
| 2007/0180490 A1 * | 8/2007 | Renzi et al. | 726/1 |
| 2008/0115204 A1 | 5/2008 | Ramsey et al. | |

FOREIGN PATENT DOCUMENTS

| | | |
|---|---|---|
| JP | 11-220610 A | 8/1999 |
| JP | 2001-282625 A | 10/2001 |
| JP | 2002-288136 A | 10/2002 |
| JP | 2003-058508 A | 2/2003 |
| JP | 2003-085048 A | 3/2003 |
| JP | 2003-167877 A | 6/2003 |
| JP | 2003-203051 A | 7/2003 |
| JP | 2003-280781 A | 10/2003 |
| JP | 2003-316650 A | 11/2003 |
| JP | 2004-030070 A | 1/2004 |
| JP | 2004-054706 A | 2/2004 |
| JP | 2006-202975 A | 9/2006 |
| WO | WO 00/05651 A1 | 2/2000 |
| WO | WO 01/37157 A1 | 5/2001 |
| WO | WO 01/57628 A1 | 8/2001 |
| WO | WO 01/69352 A1 | 9/2001 |
| WO | WO 03/005268 A1 | 1/2003 |
| WO | WO 03/040945 A1 | 5/2003 |
| WO | WO 2004/023727 A1 | 3/2004 |

OTHER PUBLICATIONS

Inoue, Koji, "Disabling unnecessary services", Accessed Feb. 28, 2012, http://www.atmarkit.co.jp/fwin2k/operation/iissecurity2/iissecurity_05.html, Jun. 29, 2002.

Takahashi, Motonobu, "How to easily change TCP/IP settings using a portable notebook PC", Accessed Feb. 28, 2012, http://www.monyo.com/technical/windows/26.html, Oct. 9, 2002.

* cited by examiner

METHOD AND DEVICE FOR SCANNING A PLURALITY OF COMPUTERIZED DEVICES CONNECTED TO A NETWORK

CROSS REFERENCE TO RELATED APPLICATIONS

This application is a Continuation-In-Part of U.S. patent application Ser. No. 11/226,451 filed on Sep. 15, 2005 which is hereby incorporated by reference in its entirety. This application further claims the benefit of the following US Provisional Applications: U.S. Provisional Application No. 60/672,050 filed on Apr. 18, 2005; U.S. Provisional Application No. 60/672,072 filed on Apr. 18, 2005; U.S. Provisional Application No. 60/672,045 filed on Apr. 18, 2005; and U.S. Provisional Application No. 60/672,046 filed on Apr. 18, 2005, and also the benefit of an Israeli Patent Application No. IL164402 filed on Oct. 5, 2004, which are all hereby incorporated by reference.

FIELD OF THE INVENTION

The present invention generally relates to the field of information security. More specifically, the present invention relates to scanning of computerized devices connected to a network.

BACKGROUND OF THE INVENTION

Information and digital information in particular, is at the heart of most organizations today. Regrettably, nowadays, information systems are under constant threat, and precious data is often at risk of being corrupted or being disclosed, or even stolen by an unauthorized party. The financial ramifications of these risks are too great to be ignored. Unfortunately, existing information security solutions are not able to provide a comprehensive solution, enabling reliable and continuous protection against existing threats compromising the organizational data.

The reliance upon the Internet for carrying different kinds of communications, both within the organizations' networks and with the outside world (public, remote sites, business partners etc.), together with the introduction into the market and the proliferation of many sophisticated miniature storage devices (e.g., USB attachable devices used as disks) and other advanced technologies, present new security challenges. Most existing IT security solutions are essentially improvements of existing solutions, and are based on the assumption that threats come from external sources (e.g., the Internet). Therefore most of the present IT security solutions regard entities within the organization's network as "trusted", whereas entities outside the organizations network are regarded as "untrusted". The increasing amount of threats making use of simple means and methods for creating backdoors into the internal organizational network is evidence of a fundamental weakness of the peripheral defense approach, which includes for example, all existing gateway security products (e.g., firewalls, anti virus, content inspection, IDS/ IPS and other filters). Indeed, world famous research groups recently estimated that over 80% of incidents of breaching organizational information security, originate from inside an organization itself (maliciously or due to lack of awareness); therefore, it is important to provide protection against external threats and internal ones (e.g., employees, contractors, etc.) and to provide security personnel with a solution, allowing them to effectively monitor activities involving computers in internal networks (for example, monitoring compliance with information security policies) and to enforce a security policy on these computers.

Attempts have been made to fill part of the security void described above. For example, some existing solutions rely on agent applications which must be installed on each device which is to be scanned and then must be managed on each of the devices where it is installed. An agent based solution requires that each computerized device, which is to be allowed to communicate with the organization's networks, be installed with the appropriate agent application. The installations, whether they are automatic, semi-automatic or manual, require substantial human resources and may be quite time consuming. An agent installation on any number of servers and workstations may fail to operate without such failure being noticed, causing a severe and undetected security breach.

A different group of information security tools includes various vulnerability scanners. Vulnerability scanners are typically used to detect unnecessary/unauthorized services, such as open ports, for example, and other vulnerabilities. Vulnerability scanners are normally not suitable for addressing all threats on the Operating System level as well as threats which operate on the application level.

When attending to the potential security threats on the computerized devices within the organization's network, it is important to be able to provide a relatively short turnaround time so that if a potential threat develops or is created somewhere in the network, it is dealt with before any serious damage is caused. For those threats which can potentially cause great damage within a very short period of time, it is important to provide an efficient security solution having a relatively very short turnaround time. The number of computerized devices which need to be checked is, in many cases, quite large and the turnaround time of a centralized solution (not depending on agents) according to the prior art may not acceptable, even if the number of threats being addressed is rather small. If in-between cycles a computerized device is exposed to potential threats, the network is not reasonably protected from serious damage due to security breaches.

US Patent Application Publication No. 2005/0097199 allegedly discloses a method and a system for scanning network devices connected to a network by detecting connection of a first network device to the network and performing remote scanning of the first network device in response to detection of the first network device. Publication '199 further allegedly discloses performing the scan without using agents. In publication '199 it is stated that there are numerous drawbacks associated with a scanning technique which is based upon a periodic remote-scan of networked computers to discover and repair security threats, and it is thus suggested to scan a networked computer in response to detection of the computer's connection or attachment to the network.

SUMMARY OF THE INVENTION

There is a need for a system, method and device to enable efficient and robust scanning of a plurality of computerized devices, without using agents. There is a need for a system, method and device which enable efficient and robust periodic agentless scanning of a plurality of computerized devices. There is a need for a system, method and device which enable efficient and robust scanning of a plurality of computerized devices, and which provides a relatively short turnaround time with respect to the scanning of the plurality of computerized devices, without using agents. There is a need for a system, method and device which enable remote scanning of a plurality of remote computerized devices in parallel and without using agents. There is a further need for a system, method and device which enable robust and efficient remote agentless and parallel scanning of a plurality of computerized devices at various times during their connection to the network.

There is a further need for a system, method and device for enforcing a security policy in parallel on a plurality of computerized devices within a network and without using agents. The system, method or device is required to enable automatic activation and/or on demand activation, and may operate either in conjunction with a preliminary scanning of the computerized devices or may be independent from data with respect to the current status of the computerized devices.

Some embodiments of the invention relate to a method of scanning a plurality of computerized devices connected to a network. According to some embodiments of the invention, a plurality of computerize devices to be scanned may be provided. A plurality of threads of an agentless module may be provided for scanning the plurality of computerized devices. Each of the plurality of threads of the agentless module may be associated with at least one of the plurality of computerized devices. The plurality of threads of the agentless module may be utilized to configure a plurality of remote access processes to scan in parallel and without using agents at least two of the plurality of remote computerized devices.

According to further embodiments of the invention each of the plurality of threads of the agentless module may be utilized to configure one or more remote access processes to scan a computerized device associated with the thread.

According to some embodiments of the invention, the number of threads to be provided may be determined in accordance with a predefined criterion.

According to some embodiments of the invention, each of the plurality of computerized devices to be scanned may be provided with data with respect to one or more data items to be scanned thereon, and the plurality of threads of the agentless module may be utilized to configure a plurality of remote access processes to scan in parallel and without using agents at least two of the plurality of remote computerized devices in accordance with one or more data items associated with the computerized devices. According to some embodiments of the invention, each thread of the agentless module may be associated with a data item to be scanned on a computerized device associated with the thread.

According to some embodiments of the invention, scanning a computerized device comprises one or more of the following: scanning the remote computerized device for data in respect of a data item associated therewith; comparing data on a computerized device in respect of a data item in accordance with a security setting associated with the data item; and updating data on a computerized device in respect of a data item in accordance with a security setting associated with the data item.

According to some embodiments of the invention, a data item may be one from a group including: a configuration, an application, a file, a process, a service, a registry key, a registry value.

According to some embodiments of the invention, the initiation of a scanning of the plurality of computerized devices may be insensitive to a new attachment of any of the plurality of computerized devices to the network. According to further embodiments of the invention, the initiation of a scanning of the plurality of computerized devices may be performed automatically in response to one or more of the following: a completion of a previous scan, an event occurring on a computerized device connected to the network, a predefined schedule.

Further embodiments of the invention relate to a device for scanning a plurality of computerized devices connected to a network. According to some embodiments of the invention, the device may include a scanning module and an agentless module. According to some embodiments of the invention, the scanning module may be adapted to provide data with respect to a plurality of computerized device to be scanned. The agentless module may be adapted to provide a plurality of threads. According to some embodiments of the invention, the scanning module may be adapted to utilize the plurality of threads of the agentless module to configure a plurality of remote access processes to scan in parallel and without using agents at least two of the plurality of remote computerized devices.

According to a further aspect of the invention, there is provided a method, a system and a device for enforcing a security policy on a plurality of computerized devices within an organization's network. According to some embodiments of the invention, a method of enforcing a security policy on a plurality of computerized devices within an organization's network may include designating a data item and an associated action for each of the plurality of computerized devices. A plurality of threads of an agentless module may be provided, and each thread may be associated with at least one of the plurality of computerized devices and with at least a data item and an associated action designated for the computerized device. Each thread of the agentless module may be adapted to configure a remote access process in a manner to cause each of the remote computerized device(s) associated with the thread to perform the designated action in respect of data corresponding to the designated data item on the remote computerized device(s), contingent upon there being data corresponding to the designated data item on the computerized device or the lack thereof.

According to further embodiments of the invention, a device for enforcing a security policy on a plurality of computerized devices within an organization's network may include an enforcement module and an agentless module. According to some embodiments of the invention, the enforcement module may be adapted to receive data designating a data item and an associated action for each of the plurality of computerized devices. The agentless module may be adapted to provide a plurality of threads, each thread being associated with at least one of the plurality of computerized devices, and in respect of each computerized device, with at least a data item and an associated action designated thereto. According to some embodiments of the invention, each thread of the agentless module may be adapted configure a remote access process in a manner to cause each of the remote computerized device(s) associated with the thread to perform the designated action in respect of data corresponding to the designated data item on the remote computerized device(s), contingent upon there being data corresponding to the designated data item on the computerized device or the lack thereof.

According to still further embodiments of the invention, a system for enforcing a security policy on a plurality of computerized devices within an organization's network may include a plurality of computerized devices and an operator's computer. According to some embodiments of the invention, the operator's computer may include enforcement module and an agentless module. According to some embodiments of the invention, the enforcement module may be adapted to receive data designating a data item and an associated action for each of the plurality of computerized devices. The agentless module may be adapted to provide a plurality of threads, each thread being associated with at least one of the plurality of computerized devices, and in respect of each computerized device, with at least a data item and an associated action designated thereto. According to some embodiments of the invention, each thread of the agentless module may be adapted configure a remote access process in a manner to cause each of the remote computerized device(s) associated with the thread to perform the designated action in respect of data corresponding to the designated data item on the remote computerized device(s), contingent upon there being data corresponding to the designated data item on the computerized device or the lack thereof.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
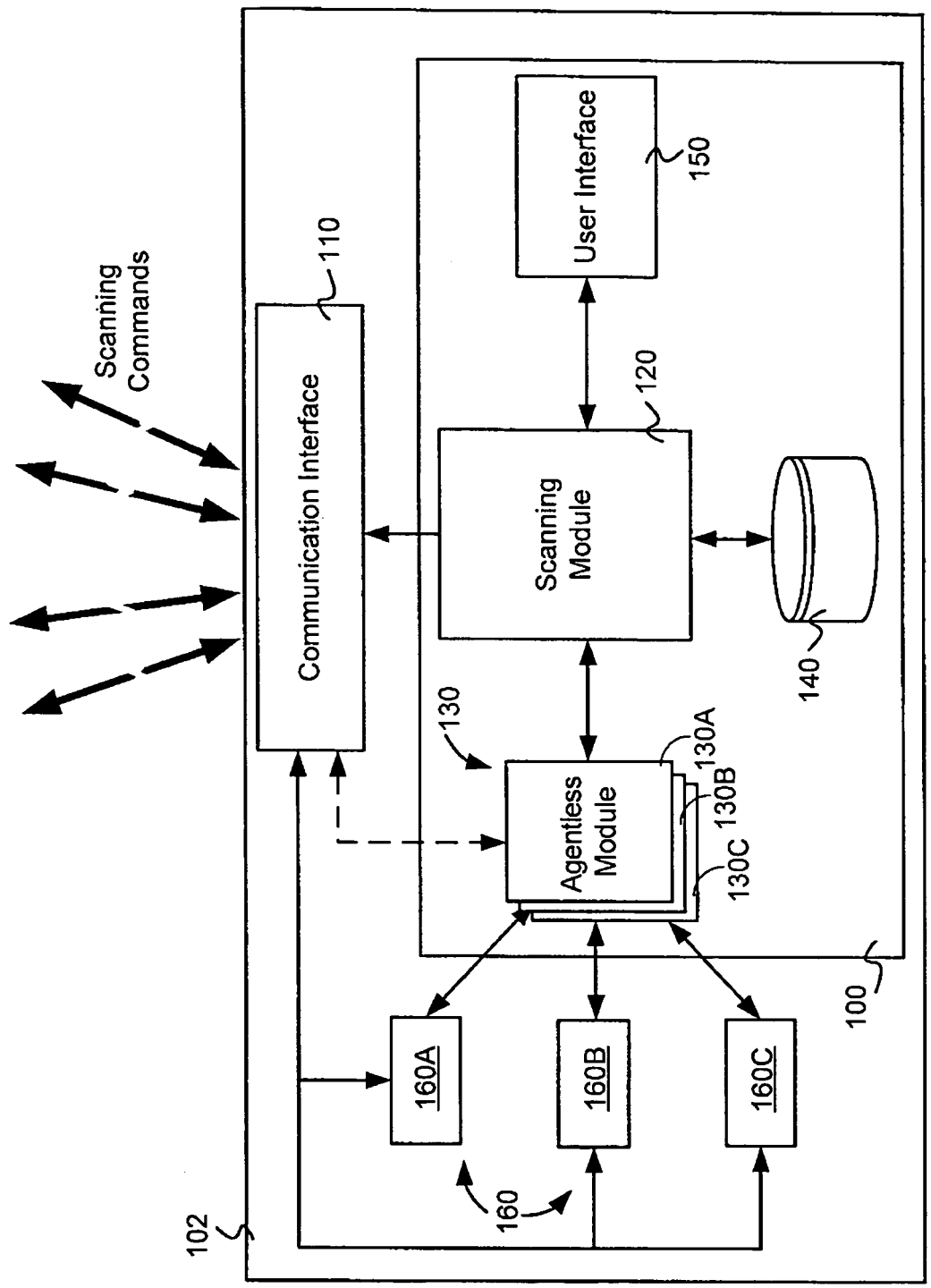
FIG. 1 is a block diagram illustration of a device for scanning a plurality of computerized devices connected to a network, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term "computerized device" or the like shall be used to mean any computer or computer-like device with networking capabilities, unless stated otherwise. According to some embodiments of the invention, a computerized device includes, but is not limited to, a personal computer, a server, a network printer, a wireless device (a cellular telephone, for example), a Smartphone, a digital personal assistant, an access point, a workstation, a minicomputer, a mainframe computer, a network infrastructure device.

Throughout the specification and the claims the term "network" shall be used to mean any group of computerized devices connected together, unless stated otherwise. Networks of computerized devices are well known. According to some embodiments of the invention, a network may include, but is not limited to, the Internet and any portion thereof, private networks, virtual private networks (VPNs), etc. The computerized devices may be connected to the network via one or more of the following: standard telephone lines, LAN, WAN links (for example, T1, T3, 56 kb, X.25), broadband connections (ISDN, Frame Relay, ATM), wireless connections, or through any other known in the present or yet to be devised in the future network connection. In addition, any suitable communication protocol may be used to enable the communication between the computerized devices within the network.

Reference is now made to FIG. 1, which is a block diagram illustration of a device for scanning a plurality of computerized devices connected to a network, according to some embodiments of the present invention. In accordance with some embodiments of the invention, a device 100 for scanning a plurality of computerized devices connected to a network may include a scanning module 120 and an agentless module 130. In accordance with some embodiments of the present invention, the scanning module 120 may be operatively connected to the agentless module 130.

The scanning module 120 may be adapted to provide a plurality of computerized devices to be scanned. According to some embodiments of the invention, the scanning module 120 may be adapted to provide for each of the computerized devices to be scanned identification data, such as for example, an IP address associated with the computerized device, a host name associated with the computerized device, or any other suitable identification. According to some embodiments of the invention, the computerized devices to be scanned may be selected by a user, for example, by specifying a range of IP addresses to be scanned. According to further embodiments of the invention, the list of computerized devices to be scanned may be obtained from other sources, such as a prime domain controller (PDC), an active directory (AD) and/or various kinds of files from which various data with respect to computerized devices to be scanned may be imported. According to further embodiments of the invention, an operator of the device 100 may utilize a user interface 150 to select the computerized devices to be scanned, for example, from amongst the computerized devices provided by one or more of the sources mentioned above.

According to some embodiments of the invention, a computerized device is to be scanned if it is in the list of computerized devices to be scanned. According to further embodiments of the invention, the device 100 is not aware of or sensitive to new attachments to the network for purposes of scanning the computerized device and particularly for purposes of initiating a scan of the computerized device (nor is any of its components). According to some embodiments of the invention, as part of scanning a computerized device and in order to verify that a computerized device is currently connected to the network, one or more pings may be sent to the computerized device to verify that it is in communication with the network. The device is not sensitive not is it aware of a new attachment of a computerized device to the network and particularly, does not trigger a scan in response to such a new attachment. Rather according to some embodiments of the invention, the device 100 may be adapted to initiate a scanning of a plurality of computerized devices periodically, for example, every certain amount of time. Such a scan may be performed in cycles and any single device may be scanned a plurality of times during its connection to the network. Scans may be initiated automatically, for example, substantially immediately after a previous scan is completed. Similarly, according to further embodiments of the invention, the device 100 may be adapted to initiate a scanning of a plurality of computerized devices in response to an event occurring on a computerized device connected to the network, during the connection of the device to the network. For example, the device 100 may be adapted to initiate a scanning of a plurality of computerized devices in response to an alert issued by an anti-virus application with respect to a security threat located on a computerized device connected to the network. Again, in accordance with these embodiments of the invention, the scanning of the computerized devices is initiated while the computerized devices are connected to the network and the initiation of the scan is indifferent to a new attachment of a device to the network.

The scanning module may be adapted to utilize or otherwise activate a plurality of threads of the agentless module 130, for example, threads 130A-130C. According to some embodiments of the invention, each of the plurality of threads of the agentless module 130 may be adapted to configure a (one or more) remote access process 160. According to some embodiments of the invention, each of the plurality of threads of the agentless module 130 may be adapted to utilize or otherwise activate a remote access process 160, for example, one or more of remote access processes 160A-160C. According to some embodiments of the invention, a remote access process 160 includes any process which may be configured to scan one or more remote computerized devices without using agents. The remote access processes 160 may include, various and different types of application program interfaces (APIs), and/or tailor-made remote agentless scanning applications or hardware, and may be integrated as part of the device 100 or it may be external to the device 100. It should be noted that as part of some embodiments of the present invention, each of the remote access processes may be adapted to utilize any known or tools yet to be devised in the future, for questioning a remote computerized device, including but not limited to various tools which are a part of some operating systems presently sold on the market. It should also be noted that some embodiments of the present invention are not limited to the use of any particular remote access process.

According to some embodiments of the invention, each remote access process 160 utilized by the agentless module to scan one or more computerized devices may be adapted to generate one or more remote queries and/or remote commands and to utilize the communication interface 110 to remotely scan the computerized device. According to further embodiments of the invention, the communication interface 110 may be used by a plurality of remote access processes to scan in parallel, and without using an agent, a plurality of computerized devices. According to yet further embodiments of the invention, one or more of the remote access processes 160 utilized by the threads of the agentless module 130 may be adapted to cause a remote computerized device being scanned to return data in connection with the scanning thereof. According to some embodiments of the invention, scanning a computerized device may include at least obtaining data with respect to data on the computerized device, as will be discussed in further detail below. According to further embodiments of the invention, scanning may include additional activities with respect to data on the computerized device, such as but not limited to, comparing data on the computerized device with a corresponding target data and updating data on the computerized device in accordance with a corresponding target data, as will be discussed in further detail below. An example of a process of comparing data on the computerized device with a corresponding target data, according to some embodiments of the invention, is described in U.S. patent application Ser. No. 11/226451 filed on Sep. 15, 2005.

The scanning module 120 may be adapted to associate each thread of the agentless module 130 with at least one of the plurality of computerized devices to be scanned. The scanning module 120 may be adapted to utilize the plurality of threads of the agentless module 130, for example threads 130A-130C, to configure, for example automatically, a plurality of remote access processes 160 to scan in parallel two or more of the plurality of remote computerized devices without using agents. According to further embodiments of the invention, the questioning module 120 may be adapted to configure each thread of the agentless module 130 to utilize one or more remote access processes 160, for example remote access processes 160A-160C, to scan each of the one or more computerized devices assigned thereto.

As mentioned above, according to some embodiments of the invention, the scanning module 120 may be adapted to utilize each of the plurality of threads of the agentless module 130 to configure one or more remote access processes 160 to scan one or more remote computerized devices, for example, to scan the computerized devices associated with the thread. The scanning module 120 may be adapted to utilize each of the threads to automatically configure a remote access process 160 to scan the computerized device(s). According to some embodiments of the invention, the scanning module 120 may be adapted to provide each thread with the necessary data to enable the thread to automatically configure the remote access process 160 to scan the computerized device(s), as will be described in further detail below.

According to some embodiments of the invention, the scanning module 120 may be adapted to utilize a plurality (two or more) of the threads of the agentless module 130 to automatically configure and utilize a plurality (two or more) of remote access processes 160 in a manner to cause two or more computerized devices to be scanned in parallel. According to some embodiments of the invention, the threads of agentless module 130 may be utilized in a manner to cause the plurality of remote access processes 160 to scan in parallel at least two of the plurality of remote computerized devices as part of scanning the plurality of computerized devices. According to further embodiments of the invention, the scanning module 120 may be adapted to utilize a plurality (two or more) of threads of the agentless module 130 in parallel, and according to still further embodiments of the invention, the plurality (two or more) of threads of the agentless module 130 may be utilized in a manner to automatically configure and utilize in parallel a plurality (two or more) of remote access processes 160. Thus, according to some embodiments of the invention, the device 100 for scanning a plurality of computerized devices connected to a network may enable the scanning of two or more computerized devices in parallel. According to some embodiments of the invention, a plurality of threads of the agentless module 130 may be utilized for enabling the scanning in parallel of a substantially large number of computerized devices. It would be appreciated, that according to some embodiments of the invention, utilizing a plurality of threads of the agentless module 130 in a manner to enable parallel scanning of a substantially large number of computerized devices may provide a relatively short turnaround time for scanning the plurality of computerized devices. According to some embodiments of the invention, the scanning module 120 may be adapted to cause the scanning of the computerized devices to repeat the scanning of the plurality of computerized devices or of some of the plurality of computerized devices immediately upon completion of a previous scan or shortly thereafter. It would be appreciated that, according to some embodiments of the invention, a relatively short turnaround time for scanning a plurality of computerized devices connected to the network, for example, a large number of such devices, combined with a relatively narrowly spaced apart scans (high frequency) may enable rapid detection of security threats and ongoing prevention activity, etc. Furthermore, according to some embodiments of the invention, the scanning module 120 may be adapted to correlate the results of the scan performed on the computerized devices and may thus be able to receive a snapshot of a threat developing within the network as well as a snapshot with respect to countermeasures activated against the threat.

According to some embodiments of the invention, the scanning module 120 may be adapted to control some aspects of the scanning of the plurality of remote computerized devices. According to some embodiments of the invention, the scanning module 120 may be adapted to determine the number of threads of the agentless module 130 which are to be used for configuring and utilizing the remote access processes 160. The scanning module 120 may be adapted to determine the number of threads of the agentless module 130 which are to be used in accordance with a predefined criterion (or criteria). According to some embodiments of the invention, the scanning module 120 may be adapted to determine the number of threads to be utilized for enabling the scanning of the computerized devices, for example in accordance with one or more of the following: a number of computerized devices to be scanned, a network performance parameter, a desired scanning speed, a connection speed vis-à-vis computerized devices to be scanned, various characteristics of the computerized devices, geographical location of the various computerized devices, statistical data collected in respect of previous scans, a result or results of a previous scan, etc. According to some embodiments of the invention, the scanning module 120 may be adapted to manually provide the number of threads of the agentless module 130 which are to be used for configuring and utilizing the remote access processes 160. As mentioned above, according to some embodiments of the invention, utilizing a large number of threads of the agentless module 130 may enable a relatively large number of computerized devices to be scanned in parallel and may allow for a reduction in the turnaround time with respect to the scanning of the plurality of computerized devices.

According to some embodiments of the invention, the number of threads of the agentless module 130 to be utilized may be determined for each scan, or the scanning module 120 may be adapted to update the number of threads to be used only after a certain number of scans, for example, after a predetermined number of scans, or in accordance with another example, in response to various parameters associated with the scan, for example in response to scan performance parameters. According to some embodiments of the invention, the scanning module 120 may be configured to use predefined numbers of threads for different and predefined kinds of scans, and may be adapted to use a predefined number of threads for all scans belonging to a specific kind of scan which is associated with that number of threads.

According to some embodiments of the invention, once the scanning module 120 determines what number of threads of the agentless module 120 to utilize in the process of scanning the plurality of computerized devices, the scanning module 120 may be adapted to invoke or otherwise activate the threads, if necessary, and may associate each thread with one or more of the plurality of computerized devices to be scanned. According to some embodiments of the invention, the scanning module 120 may be adapted to associate at least one of the threads of the agentless module 130 with two or more computerized devices. The association of the computerized devices may be performed in accordance with a predefined criterion/a or ad-hoc, for example, in accordance with certain characteristics, parameters or rules, for example, in accordance with certain characteristics, parameters or rules associated with the computerized device, in accordance with parameters associated with a connection to the computerized device, in accordance with various characteristics of the computerized device (for example—type of hardware, operating system), geographical location of the various computerized device, organizational location of the various computerized devices (departments for example), statistical data collected in respect of previous scans, a result or results of a previous scan. According to some embodiments of the invention, in alternative or in addition, the association of the computerized devices may be sensitive to a scanning policy or policies, a number of data items to be scanned, a type of data items to be scanned however, according to other embodiments of the invention, the computerized devices may be substantially evenly divided amongst the available threads of the agentless module 130. In addition, according to some embodiments of the invention, a plurality of computerized devices to be scanned may be inserted to a queue and the scanning module 120 may be adapted to assign computerized devices from the queue, such that the next computerized device in the queue is assigned to the next available thread when it becomes available or to the next available thread which is relevant for scanning the next in queue computerized device for the data item that is to be scanned on that computerized device and/or other criteria. Thus the scanning module may be adapted to assign a computerized device from the queue to a certain thread of the agentless module, when the thread becomes available, for example, when the thread completes a configuration of an associated remote access process or when an associated remote access module becomes available. According to some embodiments of the invention, as part of associating a computerized device with a thread of the agentless module 130, the scanning module 120 may be adapted to provide the thread with identification data in respect of the computerized device. According to some embodiments of the invention, the scanning module 120 may be adapted to re-associate computerized devices to be scanned during a scan, and may transfer a computerized device from one thread of the agentless module 130 to another. The transfer of computerized devices during a scan may be preformed in accordance with a predefined criterion, for example, in accordance with the progress of the scan and/or the load on each thread.

The thread(s) of the agentless module 130 may include any necessary logic to enable it, either alone or in cooperation with the scanning module 120, to configure, utilize and manage the operation of the remote access process(es) 160 for scanning the computerized device(s) associated with the thread. The thread(s) of the agentless module 130 either independently or in cooperation with the scanning module 120, may be configured to determine when to utilize, which remote access process 160 to scan which computerized device. According to some embodiments of the invention, the agentless module 130 either independently or in cooperation with the scanning module 120, may be adapted to implement various criteria to determine when to utilize which remote access process 160 to scan which computerized device and may be adapted to utilize various queue management techniques for that purpose. According to some embodiments of the invention, the scanning module 120 may be adapted to configure the agentless module 130 and any of its threads to repeat a scanning cycle after predetermined time periods, at predetermined times, etc. According to further embodiments of the invention, the scan may also be initiated on demand, for example, by an operator. According to some embodiments of the invention, the scanning module 120 may be adapted to configure the agentless module 130 and any of its threads to repeat a scanning cycle substantially immediately upon completion of a previous scanning cycle. According to further embodiments of the invention, the threads of the agentless module 130 may be configured to automatically perform a predefined number of scanning cycles consecutively. According to yet further embodiments of the invention, the scanning module 120 may be adapted to configure the agentless module 130 and any of its threads to perform different kinds of scans consecutively. The agentless module 130 may thus be configured to automatically perform a certain series of scans consecutively, for example one kind of a scan substantially immediately after another kind of scan was completed. According to some embodiments of the invention, each scan may be performed with respect to the same plurality of computerized devices or with respect to different computerized devices, with some overlap between computerized devices or without any overlap.

According to some embodiments of the invention, the scanning module 120 may be adapted to provide for each of the plurality of computerized devices to be scanned data with respect to a data item (one or more) to be scanned thereon. The scanning module 120 may be adapted to utilize the plurality of threads of the agentless module 130 to configure the plurality of remote access processes 160 to scan the plurality of computerized devices in accordance with the data items associated with each computerized device. According to some embodiments of the invention, the data items to be scanned on a computerized device may be provided manually, for example via a user interface, selected from a database including a list of data items, or in any other way. According to further embodiments of the invention, one or more of the data items to be scanned on a computerized device may be predefined data items, which the scanning module 120 may be configured, for example, to cause to be scanned as part of each scanning of the computerized device. In accordance with further embodiments of the invention, the scanning module 120 may be adapted to cause different data items to be scanned as part of different scans.

According to some embodiments of the invention, a data item may relate to a specific data on a remote computerized device. According to further embodiments of the invention, a data item is one of a group which includes, but is not limited to, a file or an application on a remote computerized device, a process or a service on a remote computerized device and a registry key on a remote computerized device. Examples of data items include for instance, a configuration file on a remote computerized device, a software patch or the lack thereof, an anti-virus application, a registry key associated with a removable mass-storage device, a process which is associated with a security vulnerability while active, a process which is associated with a security vulnerability while inactive. According to some embodiments of the invention, a computerized device may be scanned for a plurality of data items substantially in parallel and without using agents.

According to some embodiments of the invention, a data item may be part of a security policy implemented by the scanning module 120. A security policy may include a plurality of data items which are to be scanned on a plurality of remote computerized devices. The scanning module 120 may be adapted to implement a plurality of security policies, for example, different security policies may be implemented in respect of different groups of computerized devices. According to some embodiments of the invention, as part of implementing a security policy, the scanning module 120 may be adapted to configure and utilize a plurality of threads of the agentless module 130 to configure a plurality of remote access processes 160 to scan in parallel and without using agents a plurality of computerized devices in accordance with a security policy associated with the plurality of computerized devices.

According to some embodiments of the invention, the scanning module 120 may be adapted to provide in respect of each data item one or more of the following: a path to the data item on a remote computerized device, a file name associated with the data item, a registry key associated with the data item, a registry key value associated with the data item, registry key data associated with the data item, a process, an application or a service name associated with the data item, a security threat with which the data item is associated, associated data items, for example, data items associated with a common security threat, data with respect to the severity of the security threat with which the data item is associated, a scanning priority associated with the data item, an action to be taken in respect of the data item, a condition for implementing an action in respect of the data item, etc. The scanning module 120 may be adapted to use the data in respect of each data item to configure each of the plurality of threads of the agentless module 130, in a manner to enable each thread to configure and utilize a remote access process(es) 160 for scanning the remote computerized device for the data item in accordance with the data in respect thereof.

For example, the device 100 for scanning a plurality of computerized devices connected to a network may enable to remotely scan in parallel and without using agents a plurality of computerized devices (two or more) for an antivirus application installed and activated on a remote computerized device. In accordance with a further example, the device 100 for scanning a plurality of computerized devices connected to a network may enable to remotely scan in parallel and without using agents a plurality of computerized devices (two or more) for a file sharing application on a computerized device. As will be discussed in further detail below, the device 100 may be adapted to remotely deactivate the file sharing application on a plurality of computerized devices (two or more) in parallel and without using an agent, and may be adapted in addition to disable and/or remove the file sharing application from the plurality of computerized devices in parallel and without using agents. In accordance with another example of the invention, the device 100 may be adapted to install a patch on a plurality of computerized devices (two or more) connected to a network in parallel and without using agents. In accordance with yet another example, the device 100 for scanning a plurality of computerized devices connected to a network may enable to remotely scan in parallel and without using agents a plurality of computerized devices (two or more) for a registry key or a specific combination of registry keys on a remote computerized device which is/are associated with a removable mass-storage device which is currently attached or which was previously attached to the computerized device. According to some embodiments of the invention, in response to an instruction to prevent a certain security threat on a plurality of computerized devices, the scanning module 120 may be adapted to automatically determine the data items associated with the security threat, and may be further adapted to utilize a plurality of threads of the agentless module 130 to configure a plurality of remote access processes in a manner to cause two or more of the plurality of computerized devices to be scanned in parallel and without using agents for the data items associated with the security threat.

According to some embodiments of the invention, the scanning module 120 may be adapted to provide for one or more data items a predefined security setting to enable auditing or updating a remote computerized device in accordance with the predefined security setting. According to some embodiments of the invention, a security policy implemented/enforced by the scanning module 120 may include a security setting for each data item included in the security policy. According to some embodiments of the invention, the scanning module 120 may provide for a data item a security setting associated with the data item. The scanning module 120 may be adapted to provide the security setting to a thread of the agentless module 130 associated with the data item to which the security setting relates.

According to some embodiments of the invention, a scanning module 120 may be adapted to utilize a thread of the agentless module 130 to configure one or more remote access processes to audit a specific data item on a remote computerized device without using an agent, in accordance with a security setting associated with the data item. According to further embodiments of the invention, a scanning module 120 may be adapted to utilize a plurality of threads of the agentless module 130 to configure a plurality (two or more) of remote access processes to audit one or more specific data items on a plurality (two or more) of remote computerized devices in parallel and without using an agent. Each data item may be audited in accordance with a security setting associated with the data item. According to some embodiments of the invention, a scanning module 120 may be adapted to utilize a thread of the agentless module 130 to configure one or more remote access processes to update a specific data item on a remote computerized device without using an agent, in accordance with a security setting associated with the data item. According to further embodiments of the invention, a scanning module 120 may be adapted to utilize a plurality of threads of the agentless module 130 to configure a plurality (two or more) of remote access processes to update one or more specific data items on a plurality (two or more) of remote computerized devices in parallel and without using an agent. Each data item may be updated in accordance with a security setting associated with the data item. It would be appreciated that, according to some embodiments of the invention, auditing the computerized devices and updating the computerized devices may be used to achieve compliance with a predefined administrative/security policy. According to some embodiments of the invention, a security policy may include data items and security settings which are part of a "black list" and/or data items and security setting which are part of a "white list". A list which includes data items and/or security setting in respect of certain data items which are allowed is referred to here by the term "white list". A white list may be used to specify prohibited data items and/or prohibited security settings by specifying anything outside the "white list" as such.

According to some embodiments of the invention, as a result of the scanning of the plurality of computerized devices, a report may be generated based upon the results of the scan. The report may include processed results or it may include the data as it was received from the computerized devices. According to further embodiments of the invention, the report may include only data which may be indicative of a security threat. The report may include additional data with respect to the security threat, such as, for example, data with respect to various characteristics of the threat. According to further embodiments of the invention, the results may be returned to the device 100 for analysis, and the device 100 may automatically initiate actions in response to certain results. For example, the device 100 may be adapted to initiate remedial actions in connection with a detected security threat. According to some embodiments of the invention, the data with respect to the action to be performed may be provided manually, for example by an operator of the device 100, or automatically. According to further embodiments of the invention, the remedial actions may be part of a subsequent remote scan of a plurality of computerized device. According to further embodiments of the invention, the subsequent remote scan may be initiated automatically, for example, in response to the results of the previous scan. According to yet further embodiments of the invention, the subsequent remote scan may be performed in parallel and without using an agent on at least two computerized devices connected to the network.

In the above description of some embodiments of the invention reference is made to a scanning module, an agentless module capable of providing a plurality of threads, and remote access processes. It would be appreciated, that according to further embodiments of the invention, two or more of the components discussed herein, and specifically, the scanning module, the agentless module capable of providing a plurality of threads, and the remote access processes may be combined into a single element. Accordingly, some embodiments of the invention relate to an element whose functionality substantially corresponds to the functionality described herein with respect to two or more of the following: the scanning module, the agentless module capable of providing a plurality of threads, and the remote access processes.

It should be noted that further details with respect to various embodiments of the invention may be obtained from U.S. application Ser. No. 11/226,451 filed on Sep. 15, 2005 with respect to which the present application is a Continuation-In-Part.

It would be further appreciated that according to some embodiments of the invention, the device for scanning a plurality of computerized devices connected to a network and any of its components may be implemented in hardware, software and any combination thereof.

Figure 2:
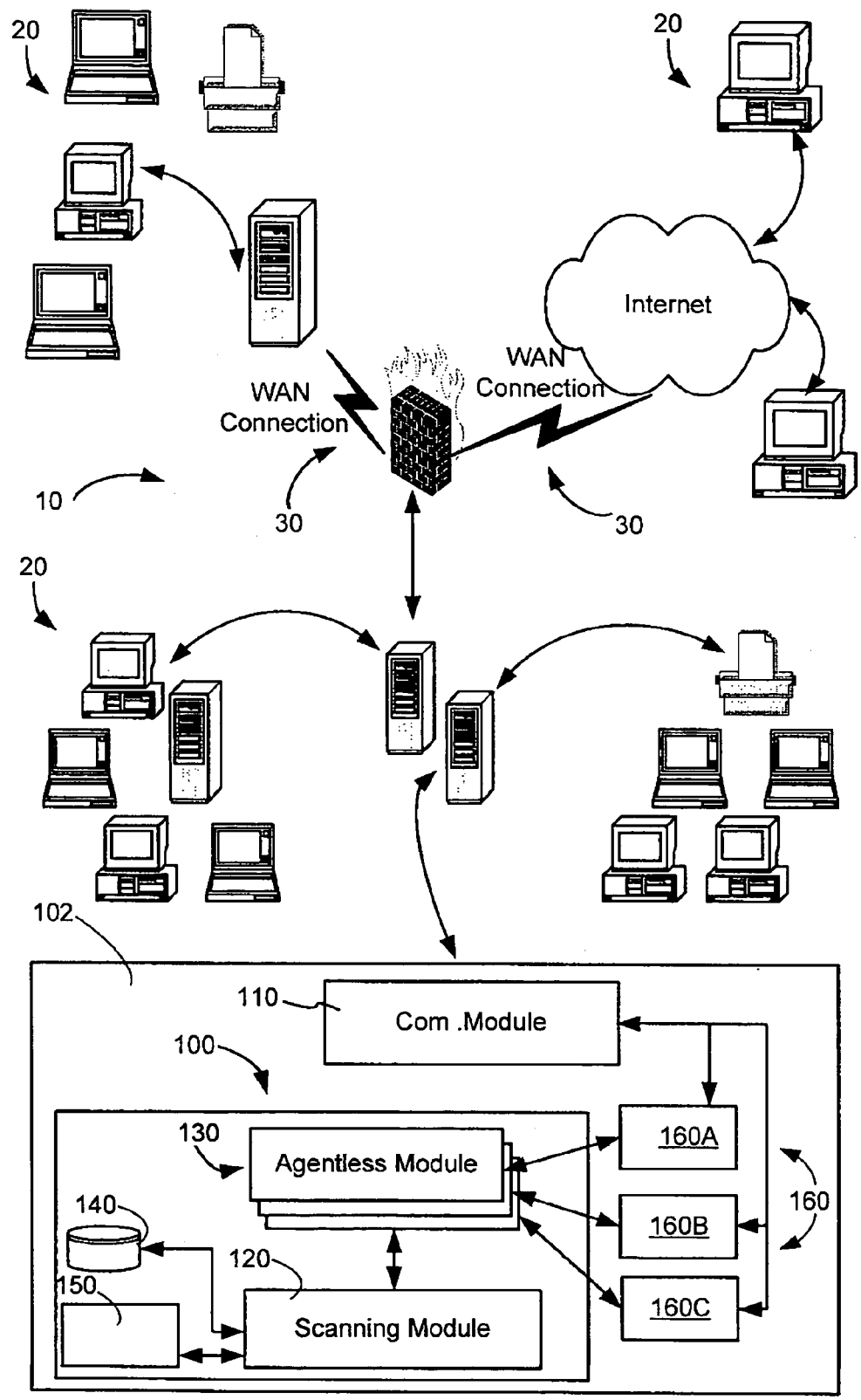
FIG. 2 is a block diagram illustration of a typical network of an organization including a device for scanning a plurality of computerized devices connected to a network, according to some embodiments of the invention.

Reference is now additionally made to FIG. 2, which is a block diagram illustration of a typical network of an organization including a device 100 for scanning a plurality of computerized devices connected to a network. In FIG. 2, and according to some embodiments of the invention, the network 10 is shown to be comprised of a plurality of local area networks (LANs) 20 connected together using different types of connections (for example—dedicated lines, the Internet) forming a wide area network (WAN) 30, which may serve, for example, two (or more) different locations or branches of the organization. It should be noted that the present invention is not limited to any particular network architecture or topology and that rather, in accordance with some embodiments of the present invention, any group of computerized devices forming a network may be scanned using the device 100.

As part of some embodiments of the present invention, the device 100 may be connected to the network 10. For example, as is shown in FIG. 2, and according to some embodiments of the invention, the device 100 may be part of one of the LANs 20, and may be operatively connected to the WAN 30 and to the computerized devices connected to WAN 30, including computerized devices which are at least partially under the control of the organization's network 10 administrator(s).

In accordance with some embodiments of the present invention, the device 100 may be operatively coupled to or may include a communication module 110. The communication module 10 may be, for example, a Network Interface Card (NIC) of an operator's computer 102 to which the device 100 may be operatively coupled. However, according to further embodiments of the invention, the device may include an integrated communication module. According to some embodiments of the invention, the communication module 110 may be configured to enable the device 100 to communicate with at least some, and typically all, of the computerized devices connected to the network 10.

It will also be understood that a system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. The computer program product may include a computer useable medium having computer readable program code embodied therein for scanning a plurality of computerized devices connected to a network, the computer program product comprising: a computer readable program code for causing the computer to provide a plurality of computerize devices to be scanned; a computer readable program code for causing the computer to provide a plurality of threads of an agentless module and associating each thread of the agentless module with at least one of the plurality of computerized devices; and a computer readable program code for causing the computer to utilize the plurality of threads of the agentless module to configure a plurality of remote access processes to scan in parallel and without using agents at least two of the plurality of remote computerized devices.

Figure 3:
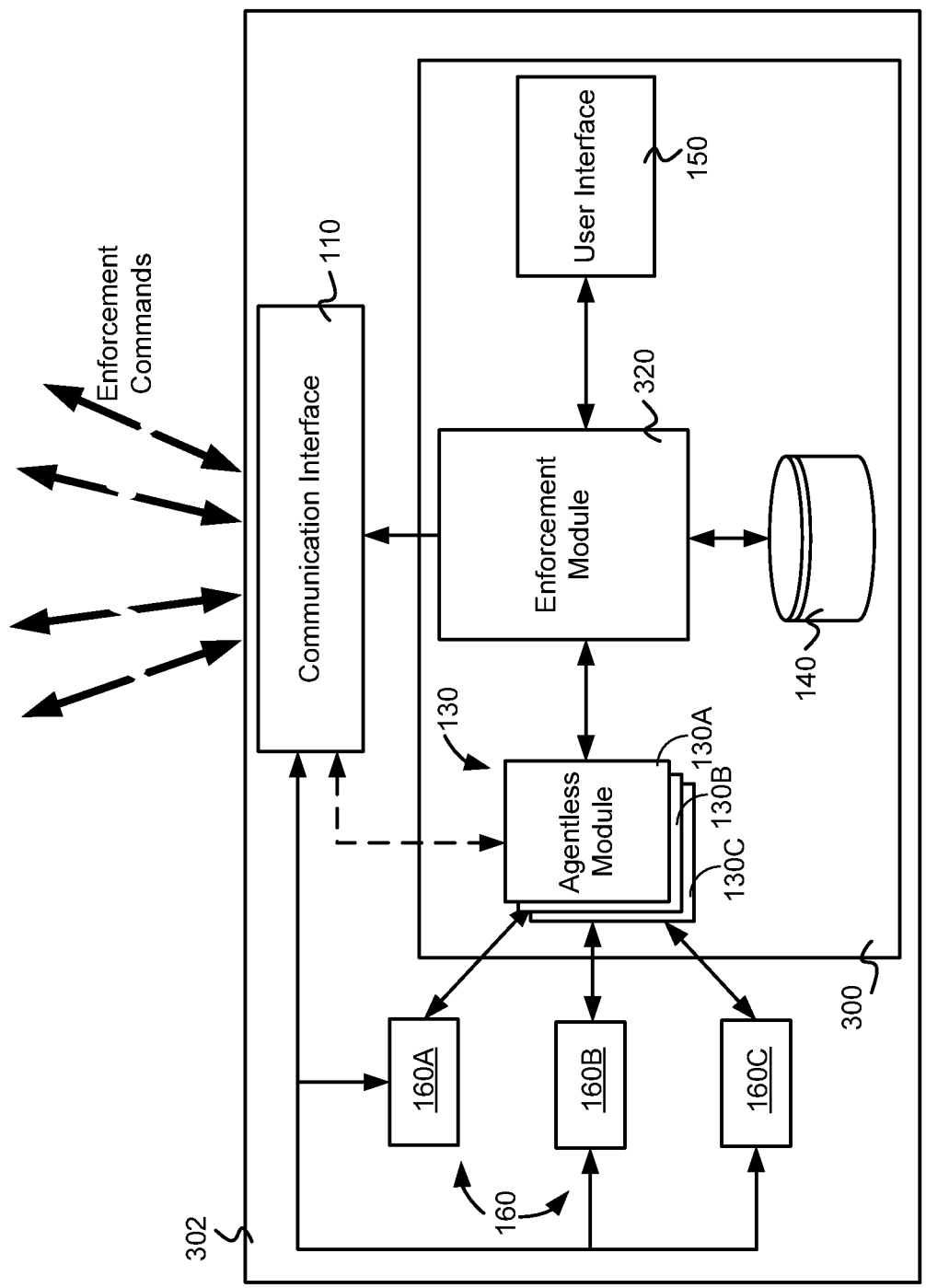
FIG. 3 is a block diagram illustration of a device for enforcing a security policy on a plurality of computerized devices connected to a network, according to some embodiments of the invention.

Provided below, is a description of specific embodiments of the invention which relates to enforcing a security policy on a plurality of computerized devices. The embodiments described below provide an example of possible implementation of some embodiments of the invention. Turning now to FIG. 3, there is shown a block diagram illustration of a device for enforcing a security policy on a plurality of computerized devices connected to a network, according to some embodiments of the invention. In accordance with some embodiments of the present invention, a device 300 for enforcing a security policy on a plurality of computerized devices connected to a network may include an enforcement module 320 and an agentless module 130. In accordance with some embodiments of the present invention, the enforcement module 320 may be operatively connected to the agentless module 130.

The enforcement module 320 may be adapted to provide a plurality of computerized devices on which a security policy is to be enforced. According to some embodiments of the invention, the security policy may be predefined or may be specifically defined for one or more enforcement cycles. According to some embodiments of the invention, the enforcement module 320 may be adapted to invoke or otherwise activate and utilize a plurality of threads of the agentless module 130, for example threads 130A-130C, in a manner to cause a plurality of remote access processes 160 to update in parallel and without using agents two or more of the plurality of computerized devices in accordance with the security policy.

According to some embodiments of the invention, a security policy may include data in respect of one or more data items and a security setting(s) associated with the data items. In accordance with further embodiments of the invention, the security policy may include any data which may be necessary in order to enable a remote access process to update the data on a computerized device connected to the network in accordance with the security setting. For example, according to some embodiments of the invention, the security policy may include a data item and data in respect of a certain action which is to be preformed in case a computerized device is not in compliance with the security policy associated with the specific item. According to further embodiments of the invention, a security policy may include data in respect of one or more of the following: an application, a file, a process, a service, a registry key, registry value or a registry value. A list of data items to be enforced on one more computerized devices may include one more "black lists" and/or one or more "white lists".

As mentioned above, the enforcement module may be adapted to utilize a plurality of threads of the agentless module 130. Each of the plurality of threads of the agentless module 130 may be adapted to utilize a remote access process 160 to enable to update the data on the plurality of computerized devices in accordance with the security policy as necessary. According to some embodiments of the invention, as part of utilizing a remote access process, a thread of the agentless module 130 may be adapted to configure the remote access process being utilized to cause without using agents one or more remote computerized devices associated with the thread to perform a designated action in respect of a designated data item with which the designated action is associated. Further according to some embodiments of the present invention, as part of implementing the security policy, a plurality of threads of the agentless module 130 may be utilized to configure a plurality of remote access processes to update without using agents a plurality of computerized devices in accordance with the security policy, as necessary. According to some embodiments of the invention, the plurality of threads of the agentless module 130 may be utilized such that two or more of the computerized devices are updated in accordance with the security policy in parallel, without using agents. According to further embodiments of the invention, the plurality of threads of the agentless module 130 may be utilized in a manner to cause, without using agents, two or more remote computerized devices to perform in parallel a designated action in respect of data items located thereon. According to yet further embodiments of the invention, the plurality of threads of the agentless module 130 may be utilized in a manner to cause without using agents two or more remote computerized devices to perform in parallel an action in respect of different data items located thereon (and possibly also different actions).

According to some embodiments of the invention, a remote access process may be any process which is adapted to cause a remote computerized device to perform a designated action with respect to a designated data item on the remote computerized device without using agents. According to further embodiments of the invention, a remote access process may be any process which is adapted to cause a remote computerized device to update a data item on the remote computerized device in accordance with a security policy, for example, a predefined security policy or a ad-hoc security policy, and without using agents. The device 100 may be associated with at least two, but possibly with more remote access processes 160 (or with a plurality of threads of a remote access process). As part of some embodiments of the invention, the remote access process 160 may be generated by the device 300 itself or may be provided by a computerized device 302 with which the device 300 or on which the device 300 is implemented. For example, the remote access processes 160 may be provided by an operating system running on an operator's computerized device 302.

It would be appreciated that as part of the present invention, in some cases, although an instruction from a remote access process is received at a remote computerized device to perform a certain action with respect to data corresponding to a certain data item, for example, an instruction to update the data item, the action may be inapplicable due to the actual status of the data corresponding to the data item on the remote computerized device being compliant with the security policy. For example, if a remote computerized device is instructed by a remote access process utilized by the device 300 to delete certain data from the registry on the computerized device and the registry on the remote computerized device does not contain such data in the first place, the action may be inapplicable. It would be further appreciated that if an instruction is received at a remote computerized device to perform a certain action with respect to data corresponding to a certain data item and the action is not applicable, for example, due to the actual status of the data corresponding to the data item, the remote computerized device may generate an exception message. According to some embodiments of the invention, if an exception message is generated on a remote computerized device in response to instruction received from a remote access process utilized by the device 300, the message may be resolved locally (for example, it is ignored). The handling of the message by the computerized devices may include ignoring the message, collecting and storing data with respect to the messages, analyzing the messages and data with respect to the messages, etc.

Thus, according to some embodiments of the invention, each thread of the agentless module 130 may be adapted to utilize one or more remote access process operable to cause one or more remote computerized devices to perform a designated action in respect of data item with which the designated action is associated, contingent upon there being certain data corresponding to the designated data item (such as, a registry key) on the computerized device or contingent upon the lack of such data on the computerized device. Further according to some embodiments of the present invention, at least two threads of the agentless module 130 may be used to configure two or more remote access processes 160 to cause two or more remote computerized devices to perform a designated action in respect of a designated data item with which the designated action is associated, contingent upon there being certain data corresponding to the designated data item on the computerized device or contingent upon the lack of data corresponding to the designated data item on the computerized device. According to still further embodiments of the present invention, at least two threads of the agentless module 130 may be used to configure two or more remote access processes 160 in a manner to cause two or more remote computerized devices to perform a designated action in respect of a designated data item with which the designated action is associated in parallel and without using agents, contingent upon there being certain data corresponding to the designated data item on the computerized device or contingent upon the lack of data corresponding to the designated data item on the computerized device.

The enforcement module 320 may be adapted to associate each thread of the agentless module 130 with one or more of the computerized devices on which the security policy is to be enforced, so that each thread of the agentless module 130 is associated with at least one of the plurality of computerized devices on which the security policy is to be enforced. It would be appreciated that dividing the plurality of computerized devices on which the security policy is to be enforced amongst the plurality of threads of the agentless module 130 may enable the enforcement of the security policy on a plurality of computerized devices in parallel and without using agents.

It should be noted that according to some embodiments of the invention, the computerized devices on which the security policy is to be enforced may include all the computerized devices connected to an organization's network or only some of the computerized devices connected to the organization's network which have been selected to undergo the policy enforcement described herein. In accordance with further embodiments of the invention, the list of computerized devices on which a security policy is to be enforced may be predetermined and predefined and may include up to all the computerized devices within the organization's network 10. However, according to other embodiments of the invention, not necessarily all the computerized devices connected to an organization's network are to undergo the policy enforcement. According to further embodiments of the invention, the list of computerized devices which are to undergo policy enforcement may be modified from time to time.

According to some embodiments of the invention, as part of selecting the computerized devices on which a security policy is to be enforced, data with respect to the computerized devices connected to the organization's network may be obtained from an organizational prime domain controller (PDC) or from an organizational active directory (AD), for example. The data is obtained to determine which computerized devices can be acted upon, and not for triggering the security policy enforcement. Further as part of providing the computerized devices on which a security policy is to be enforced, an operator of the device 300 may utilize the user interface 150 to select from amongst the computerized devices connected to the organization's network which computerized devices are to undergo the policy enforcement. In accordance with further embodiments of the invention, the data with respect to the computerized devices on which a security policy is to be enforced may be obtained from a file containing suitable data. It should be appreciated that several security policies may be created, and each security policy may be enforced on a different group of computerized devices.

In accordance with some embodiments of the present invention, the enforcement module 320 may be adapted to determine what number of threads of the agentless module 130 to create and/or utilize. The selection of the number of threads to be created and/or utilized was discussed above. According to one embodiment of the present invention, the enforcement module 320 may be preconfigured to utilize one of several pre-selected numbers of threads of the agentless module 130 pending an appropriate selection, and an operator of the device 300 may select the desired number of threads of the agentless module 130 to be used as part of the enforcement process. For example, different numbers of threads may be associated with different enforcement speeds and the operator may determine the number of threads to be used (or to be invoked) by selecting the desired operation speed (for example—very slow, slow, medium, high and very high). According to further embodiments of the present invention, a fixed number of threads of the agentless module 130 may be created. It would be appreciated that some embodiments of the invention are not limited in this respect.

The enforcement module 320 may be adapted to determine which of the plurality of computerized devices is to be assigned to which thread of the agentless module 130 as was discussed above. For example, in accordance with one embodiment of the invention, the enforcement module 320 may be configured to substantially evenly divide the specified computerized devices between all the threads of the agentless module 130 which are to be utilized. In accordance with further embodiments of the present invention, the computerized devices may be divided amongst the threads of the agentless module 130 in accordance with predefined rules and/or based upon predefined criteria or parameters. However, the present invention is not limited in this respect, and the enforcement module 320 may be configured to otherwise determine which of the computerized devices is to be assigned to which thread of the agentless module 130.

In addition, with respect to each computerized device, the enforcement module 320 may be adapted to associate the thread of the agentless module 130 with which a computerized device is associated with a data item which is part of the security policy associated with the computerized device. According to further embodiments of the invention, the enforcement module 320 may be adapted to associate the thread of the agentless module 130 with which a computerized device is associated with a predefined action to be performed on the computerized device with respect to a data item which is part of the security policy associated with the computerized device. According to some embodiments of the invention, in case more than one data item is designated for a computerized device, and the enforcement module 320 associates the computerized device with a single thread of the agentless module 130, the enforcement module 320 will associate the thread with all the data items and corresponding actions which were designated for that computerized device, however in case the enforcement module 320 associates the computerized device with two or more threads, the designated data items may be divided amongst the threads with which the computerized device is associated.

Each thread of the agentless module 130 may be adapted to utilize a remote access process 160, as was discussed above. According to some embodiments of the invention, two or more of the remote access processes 160 utilized by the threads of the agentless module may be operable to cause without using agents a plurality (two or more) of remote computerized devices to perform an action in parallel with respect to at least a data item. According to some embodiments of the invention, the agentless module 130 may include the necessary logic needed to enable two or more threads of the agentless module 130 to configure and utilize at least two remote access processes 160 to cause without using agents two or more computerized devices to perform in parallel a designated action with respect to at least a designated data item.

It would be appreciated by those of ordinary skill in the art, that according to some embodiments of the invention, using a plurality of threads of the agentless module 130 to utilize in parallel a plurality of remote access processes, may enable to perform without using agents a designated action in parallel on a plurality of remote computerized device with respect to data corresponding to a designated data item or items. According to other embodiments of the invention, the plurality of threads of the agentless module 130 may be utilized in a manner to cause remote access processes 160 to be utilized in a manner to cause two or more computerized devices to perform without using agents a designated action with respect to a data item or data items in parallel.

According to some embodiments of the invention, a plurality of threads of the agentless module 130 may be adapted to configure and utilize a plurality of remote access processes 160 to cause a plurality of remote computerized device(s) associated with the threads to perform a designated action with respect to a data item with which the action is associated, contingent upon there being data corresponding to the designated data item on the computerized device or contingent upon the lack of data corresponding to the designated data item on the computerized device.

As part of some embodiments of the present invention, each remote access process 160 may be utilized in a manner to generate at least a command for each computerized device associated with the thread of the agentless module 130 used to utilize the remote access process. Each command may be effective for causing the remote computerized device to perform without using an agent a designated action with respect to a data item on the computerized device, contingent upon there being data corresponding to the data item on the computerized device or contingent upon the lack of such data on the computerized device. According to some embodiments of the invention, at least two remote access processes 160 may be utilized in a manner to generate at least two commands intended to cause each of at least two computerized devices to perform substantially in parallel and without using agents a designated action with respect to a data item, contingent upon there being data corresponding to the data item on the computerized device or contingent upon the lack of certain data in respect of the data item on the computerized device.

One example of a remote access process which may be used by the device 100 (and specifically by a plurality of threads of the agentless module 130) to cause a plurality of computerized devices to perform a certain action with respect to at least a designated data item with which the action is associated, includes various kinds of application programming interfaces (APIs). It will be appreciated by those of ordinary skill in the art, that various remote access processes, including various APIs, may be an integrated component of some operating systems sold on the market, however, other APIs may also be used. In accordance with further embodiments of the present invention, the threads of the agentless module 130 may be configured to utilize various other APIs in a manner to cause without using an agent a remote computerized device to perform a designated action with respect to designated data items with which the designated actions are associated, including but not limited to, APIs capable of causing a remote computerized device to add and/or remove an application, APIs capable of causing a remote computerized device to invoke/terminate a process on the computerized device(s), APIs capable of causing a remote computerized device to start/stop a service, APIs capable of updating, writing into or deleting from a registry of the computerized device.

In order to enable a remote access process to cause a remote computerized device to perform a designated action in respect of a designated data item (such as a registry key), for example, to enable it to update a certain data item, each thread of the agentless module 130 may be adapted to provide a remote access process with the necessary data with respect to a computerized device, a designated data item and an associated action to be preformed with respect to the data item on the computerized device. In case a plurality of computerized devices are associated with a certain thread of the agentless module 130, the thread may provide the network address of each of the computerized devices associated with the thread to the relevant remote access process(es) for enabling it to update the relevant data items on the computerized devices. However, further embodiments of the invention are not limited in this respect, and the computerized device on which the security policy is to be enforced may be otherwise identified, including but not limited to, by their host names.

According to some embodiments of the invention, the data items associated with the security policy may be selected automatically, for example, based upon statistical data collected during previous scans of computerized devices connected to the network, or in addition or as an alternative, one or more data items may be designated manually, for example, by an operator of the device 300. The device may include a user interface 150 through which the operator can provide the necessary data in respect to the data items. The operator may utilize the user interface 150 to provide data regarding an action to be performed as part of the security policy with respect to a designated data item, or the action to be performed in respect to a data item may be provided automatically. The device 300 may also include a database 340 or any other data structure which includes data with respect to data items, and the data items to be included in the security policy may be selected automatically and/or manually from the database 340. The database 340 may further include data with regard to actions which may be performed with respect to the data items and the actions to be performed on the data items included in the security policy may be selected from the database 340 automatically and/or manually.

Figure 4:
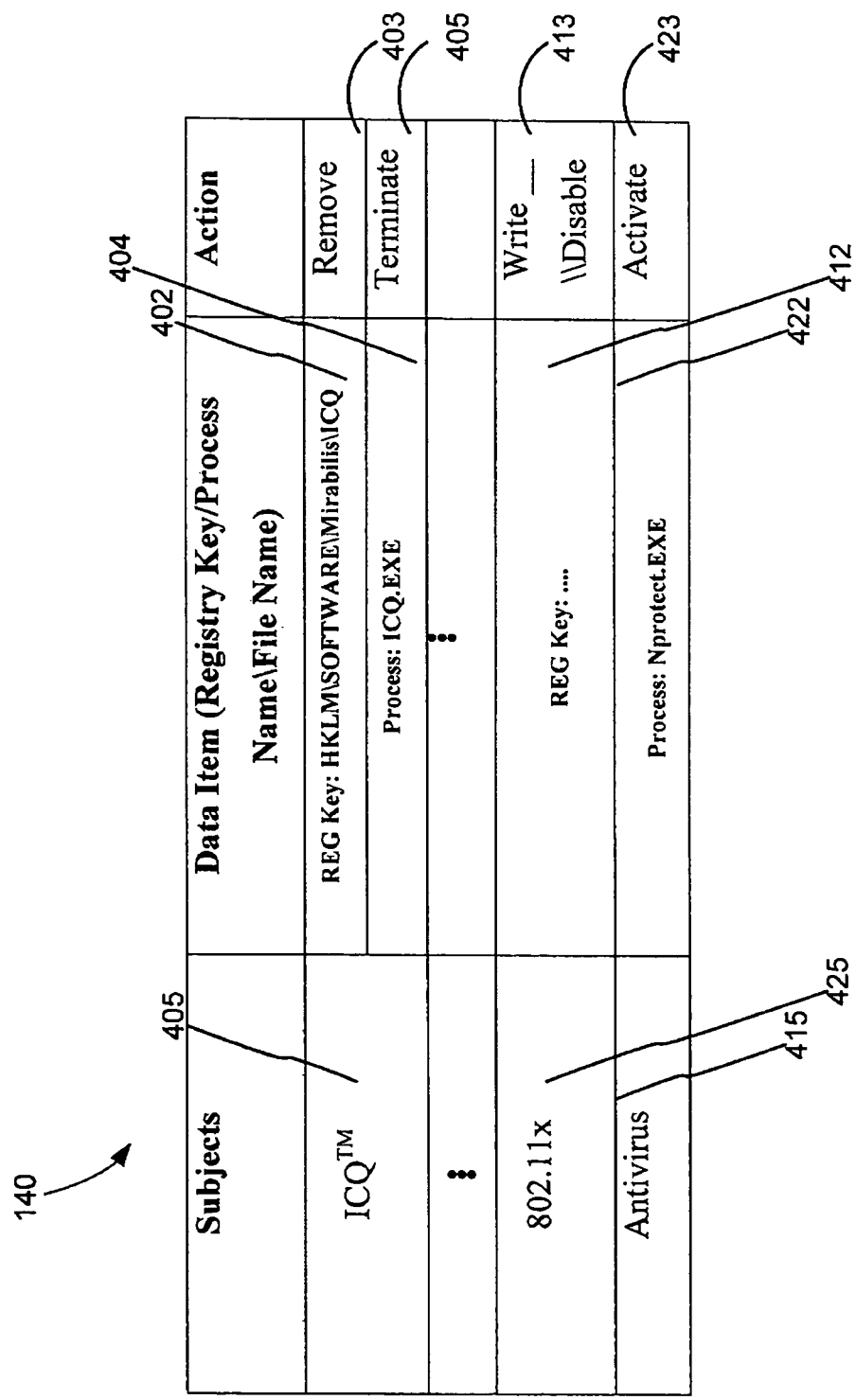
FIG. 4 an lustration of a portion of a table which may be used in accordance with some embodiments of the invention for enabling the enforcement of a security policy on a plurality of computerized devices connected to a network.

Reference is now made to FIG. 4, which is a an illustration of an exemplary database including data with respect to data items, and data with respect to action which may be used to configure a threads of the agentless module, according to some embodiments of the invention. In accordance with some embodiments of the invention, the data stored in the database 340 may be, but is not necessarily, associated with security threats. According to further embodiment of the invention, the data in the database 340 may be associated with various applications, services, processes, registry keys/values and/or hardware devices which may pose a potential security threat when enabled, active and/or installed on a computerized device connected to the organization's network, and should therefore be disabled, de-activated and/or uninstalled; and/or the data in the database 140 may be associated with various applications, services, processes, registry keys/values and/or hardware devices which may protect the organization network from security threats and which therefore need to be installed, activated and enabled on a computerized device in order to prevent potential security threats.

Reference is now made to FIG. 4, which is an lustration of a portion of a table which may be used in accordance with some embodiments of the invention for enabling enforcing a security policy on a plurality of computerized devices connected to a network. In FIG. 4, the database 340 includes data with respect to a registry key 402, a process 404 and a file (not shown) which are associated with the same application, in this case, ICQTM, an instant messaging application. For each of the registry key 402, process 404 and file associated with the ICQTM application, the database 340 includes data with respect to an action which is to be performed in respect of the corresponding data item. In FIG. 4, according to the security policy, ICQTM is not allowed. Thus, with respect to the registry key 402 associated with ICQTM, the database 340 includes a "remove" action 403, which is intended to enable the configuration of a remote access process to cause a remote computerized device to remove without using agent the data of registry key 402 (or the entire registry key) with which the remove action 403 is associated, contingent upon there being data with respect to the registry key 402 in the registry of the remote computerized device. With respect to the process 404 associated with ICQTM, the database 440 includes a "terminate" action 405, which is intended to enable the configuration of a remote access process to cause a remote computerized device to terminate without using agents the process 404 with which the terminate action is associated, contingent upon the designated process being active on the remote computerized device.

The database 340 may also include data with respect to a certain file (not shown) associated with ICQTM, for example, and an action with respect to the file. For example, the file may be an uninstall file which is intended to remove the ICQTM application from a computerized device, and the action may be a "run" or "execute" action which is intended to enable the configuration of a remote access process to cause (without using agents) a remote computerized device to execute the uninstall file, contingent upon there being an appropriate uninstall file on the remote computerized device.

In exemplary the database 340 shown in FIG. 4 there is also included data with respect to a registry key 412 which is associated with a wireless communication modem and an action 413 associated with the registry key 412. The action 413 associated with the registry key 412 is intended to enable the configuration of a remote access process to cause (without using agents) a remote computerized device to modify data in the remote computerized device's registry which corresponds to the registry key 412, such that a wireless communication device associated with the computerized device is disabled. In the case of registry key 412, the hardware device associated with the registry key is disabled by modifying the data corresponding to the registry key rather than by deleting the registry key.

Also included in the database 340 shown in FIG. 4, and according to some embodiments of the invention, a data item 422 correlated with a process associated with an anti-virus application is provided, as well as an action 423 associated with the data item 422. The action 423 associated with data item 422 is intended to enable the configuration of a remote access process to cause (without using agents) a remote computerized device to activate the process associated with data item 422 on the remote computerized device.

According to some embodiments of the invention, the database 340 may include any additional data which may be necessary to enable a thread of the agentless module to utilize a remote access process to cause without using agents a remote computerized device to perform a designated action with respect to a designated data item with which the designated action is associated. For example, in accordance with some embodiments of the present invention, the database 340 may include for a certain data item data with respect to a location on a computerized device where data corresponding to the data item is expected to be found. Such data may be provided to the remote access process to provide the remote access process with data in respect of the location of the data item on a remote computerized device. The data with respect to a location on a computerized device where data corresponding to a data item is expected to be found may include a path(s) to a specific location(s)) on a computerized device which is associated with the data item.

In FIG. 4, each data item is associated with a certain subject. Each subject may provide a description with respect to an application, a service, a registry key/value and/or hardware device associated with the subject. Each subject may be associated with one or more data items. For example, in database 340, registry key 402, process 404, and file or application (not shown) are associated with the ICQTM subject 405; registry key 412 is associated with a 802.11x compatible hardware device subject 425; and process 422 is associated with the Antivirus subject 415.

Figure 5:
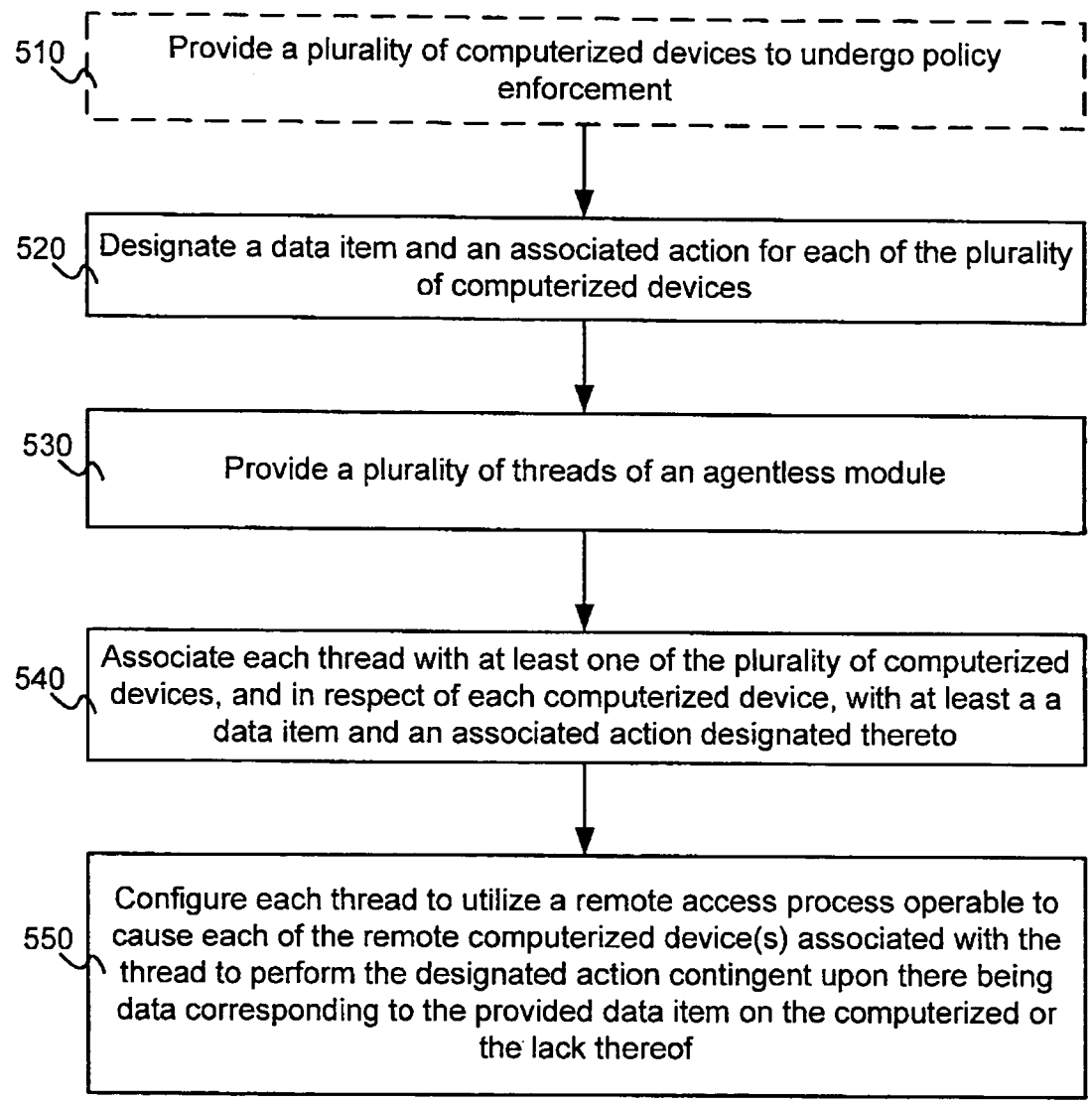
FIG. 5 is a flow chart illustration of a method of enforcing a security policy on a plurality of computerized devices connected to a network, according to some embodiments of the present invention.

Reference is now additionally made to FIG. 5, which is a flow chart illustration of a method of enforcing a security policy on a plurality of computerized devices connected to a network, according to some embodiments of the present invention. Initially, a plurality of computerized devices may be provided for undergoing policy enforcement (block 510). For each of the computerized devices which are to undergo policy enforcement a data item and an associated action may be designated (block 520). As mentioned above, according to further embodiments of the invention, for a computerized device which is to undergo policy enforcement (or for a group of such computerized devices) several data items may be designated.

Next, a plurality of threads of an agentless module may be utilized (block 530). According to some embodiments of the invention, the number of threads of the agentless module provided for enforcing the security policy may be predefined. According to further embodiments of the invention, the number of threads which may be provided may be dynamic and may depend upon, for example, the number of computerized devices selected for undergoing policy enforcement, the number of data items which have been designated, current network performance parameters, as well as on other parameters, rules, characteristics. The plurality of threads of the agentless module may be generated on demand based upon what was determined with respect to the number of threads to be used. The enforcement module may be configured to determine what number of threads is to be provided in accordance with predefined criteria and based upon one or more parameters, rules or characteristics.

Each of the threads of the agentless module may be associated with at least one of the plurality of computerized devices, and in respect of each computerized device, with at least a data item and an associated action designated thereto (block 540). According to some embodiments of the invention, the computerized devices may be associated with the plurality of threads of the agentless module in accordance with a predefined criterion/a as was discussed above.

After the computerized devices and their designated data items and associated action are associated with the plurality of threads of the agentless module, each thread may be configured to utilize a remote access process(es). The threads may be configured to utilize the remote access processes to cause the computerized device(s) associated with the remote access process to perform at least a designated action with respect to at least a designated data item with which the designated action is associated, contingent upon there being data corresponding to the designated data item on the computerized devices or contingent upon the lack of data corresponding to the designated data item on the computerized device (block 550).

It would be appreciated that some embodiments of the invention allow an organization to enforce a certain security policy on a plurality of computerized devices in parallel and without being dependant on agents, substantially as described above. It would therefore be apparent to those of ordinary skill in the art that some embodiments of the invention may provide substantial advantages. For example, an administrator utilizing a device in accordance with some embodiments of the invention may be capable of enforcing a certain security policy on a plurality of computerized devices in parallel and without being dependent on agents, so that the turnaround time needed to complete a full enforcement cycle with respect to the potential threats which are being addressed by the device is kept relatively short, while credibility is at a relatively high level (no agents are used). According to some embodiments of the invention, security policy enforcement cycle may be routinely performed (around the clock, for example), or it may be in response to predefined events or criteria or manually initiated, in which case the security enforcement scan may also be repeated several times or it may be performed in several scanning/enforcement cycles. However, it should be noted that some embodiments of the invention are not limited by any particular performance attributes or parameters nor is it limited to any particular credibility quality or level.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

What is claimed is:

1. A method of remotely enforcing a policy within a plurality of computerized devices in a network, the method implemented by a plurality of computer readable instructions encoded on a non-transitory computer readable storage device, said instructions executable by a computer, said method comprising:

designating a data item and an associated action for each of a plurality of computerized devices;

causing, in parallel, a plurality of threads of a remote access process to instruct, without using an agent, the plurality of computerized devices to carry out the designated action regardless of whether or not actual data which corresponds to the designated data item is present in each of the remote computerized devices; and repeating said causing for at least a subset of said plurality of computerized devices and said data items irrespective of a result of a previous iteration of said causing.

2. The method according to claim 1, where said repeating is initiated substantially immediately after a previous iteration of said causing is complete.

3. The method according to claim 1, where said repeating is initiated after a predefined time interval after a previous iteration of said causing.

4. The method according to claim 1 wherein said designating a data item comprises providing, for each of the plurality of computerized devices, data with respect to said data item.

5. The method according to claim 1, wherein said step of causing comprises associating at least one of the threads with two or more computerized devices.

6. The method according to claim 1, wherein said step of causing comprises determining the number of threads to be used in accordance with a predefined criterion.

7. The method according to claim 6, wherein said step of determining comprises determining the number of threads to be provided in accordance with one or more of the following: a number of computerized devices on which said enforcing is to be made, a network performance parameter, a target enforcing speed, a connection speed with respect to the computerized devices on which said enforcing is to be made, various characteristics of the computerized devices, geographical location of the computerized devices on which said enforcing is to be made, statistical data collected in respect of previous enforcements.

8. The method according to claim 7, wherein said method further comprises associating each thread of the remote access process with at least one of the plurality of computerized devices in accordance with one or more of the following: parameters associated with a connection to the computerized device, characteristics of the computerized device, geographical location of the computerized device, organizational location of the computerized devices, statistical data collected in respect of previous enforcements.

9. The method according to claim 8, wherein said step of associating further comprises associating each thread of the remote access process with a data item to be remotely enforced within a computerized device associated with the thread.

10. The method according to claim 9, wherein said step of causing a plurality of threads of the remote access process comprises determining the number of threads to be configured in parallel in accordance with at least one or more of the following: a severity of a data item or data items to be enforced, a number of data items to be enforced, a target enforcing speed, a connection speed with respect to the computerized devices on which said enforcing is to be made.

11. The method according to claim 9, wherein said step of associating each thread of the remote access process with a data item to be remotely enforced within a computerized device associated with the thread, comprises associating a first thread of the remote access process with a first data item to be remotely enforced within a first computerized device and associating a second thread of the remote access process with a second data item to be remotely enforced within the first computerized device.

12. The method according to claim 10, wherein two or more threads of the remote access process are configured in parallel for remotely enforcing without using an agent a remote computerized device with respect to two or more different data items.

13. The method according to claim 4, wherein the data with respect to a data item to be enforced includes one or more of the following: a path to a location within a computerized device, data with respect to a severity of a security threat associated with the data item, data with respect to a remote access process to be used for enforcing within a remote computerized device for data in respect of the data item, a security setting associated with the data item, a type of the data item.

14. The method according to claim 1, wherein said designated action is updating data in respect of a respective data item within a computerized device in accordance with a security setting associated with the data item.

15. The method according to claim 1, wherein a data item is one from a group including: a configuration, an application, a file, a process, a service, a registry key, a registry value within a remote computerized device.

16. The method according to claim 1, wherein said enforcing is insensitive to a new attachment of any of the plurality of computerized devices to the network.

17. The method according to claim 1, wherein said enforcing is performed automatically in response to one or more of the following:
a completion of a previous enforcement, an event occurring within a computerized device connected to the network, a predefined schedule.

18. The method according to claim 1, wherein said method enables a relatively short turnaround time between said causing and said repeating.

19. A device for enforcing a policy within a plurality of computerized devices in a network, said device comprising:
an enforcement module adapted to receive data designating a data item and an associated action for each of a plurality of computerized devices; and
an agentless module adapted to cause, in parallel, a plurality of threads of a remote access process to instruct, without using an agent, the plurality of computerized devices to perform the designated action within the plurality of remote computerized devices regardless of whether or not actual data which corresponds to the designated data item is present in each of the remote computerized devices.

20. The device according to claim 19 wherein said agentless module is further adapted to repeat said configure for at least a subset of said plurality of computerized devices and said data items irrespective of a result of a previous iteration of said configure.

21. The device according to claim 20, where said repeat is initiated substantially immediately after a previous iteration of said causing is complete.

22. The device according to claim 20, wherein said repeat is initiated after a predefined time interval after a previous iteration of said configure.

23. The device according to claim 19, wherein the agentless module is adapted to associate at least one of the threads with two or more computerized devices.

24. The device according to claim 19, wherein the agentless module is adapted to determine the number of threads to be configured in parallel.

25. The device according to claim 19, wherein the number of threads to be configured in parallel is manually selected by an operator.

26. The device according to claim 24, wherein the number of threads is determined in accordance with a predefined criterion.

27. The device according to claim 19, wherein said agentless module is adapted to cause a thread of the remote access processes to perform in parallel enforcement within at least two of the plurality of remote computerized devices based on one or more respective data items.

28. The device according to claim 27, wherein said agentless module is adapted to associate each thread of the remote access process with a data item to be enforced on a computerized device associated with that thread.

29. The device according to claim 27, wherein the agentless module is adapted to utilize the plurality of threads of the remote access process to update data within a computerized device in respect of a respective data item in accordance with a security setting associated with the data item.

30. The device according to claim 19, wherein a data item is selected from a group including: a configuration, a file, a process, a service, a registry key, a registry value, a registry value within a remote computerized device.

31. The device according to claim 19, wherein the agentless module is adapted to initiate enforcement within the plurality of computerized devices, and wherein the initiation of the enforcement within the plurality of computerized devices is insensitive to a new attachment to the network of any one of the plurality of computerized devices.

32. The device according to claim 19, wherein the agentless module is adapted to automatically initiate enforcement within said computerized devices in response to one or more of the following: a completion of a previous enforcement, an event occurring within a computerized device connected to the network, a predefined schedule.

33. A system enabling a policy enforcement within a plurality of computerized devices in a network, said system comprising:
 a plurality of computerized devices;
 an operator's computer, said operator's computer comprising:
 an enforcement module adapted to receive data designating a data item and an associated action for each of the plurality of computerized devices; and
 an agentless module to cause, in parallel, a plurality of threads of a remote access process to instruct, without using an agent, the plurality of computerized devices to perform the designated action within the plurality of remote computerized devices, regardless of whether or not actual data which corresponds to the designated data item is present in each of the computerized devices.

34. The system according to claim 33 wherein said agentless module is further adapted to repeat said causing for at least a subset of said plurality of computerized devices and said data items irrespective of a result of a previous iteration of said causing.

35. The device according to claim 34, where said repeat is initiated substantially immediately after a previous iteration of said causing is complete.

36. The device according to claim 34, wherein said repeat is initiated after a predefined time interval after a previous iteration of said causing.

37. The device according to claim 33, wherein the agentless module is adapted to associate at least one of the threads with two or more computerized devices.

38. The device according to claim 33, wherein the agentless module is adapted to determine the number of threads.

39. The device according to claim 33, wherein the number of threads is manually selected by an operator.

40. The device according to claim 38, wherein the number of threads is determined in accordance with a predefined criterion.

41. The device according to claim 33, wherein said agentless module is adapted to cause a thread of the remote access processes to perform in parallel enforcement within at least two of the plurality of remote computerized devices based on one or more respective data items.

42. The device according to claim 41, wherein said agentless module is adapted to associate each thread of the remote access process with a data item to be enforced on a computerized device associated with that thread.

43. The device according to claim 41, wherein the agentless module is adapted to utilize the plurality of threads of the remote access process to update data within a computerized device in respect of a respective data item in accordance with a security setting associated with the data item.

44. The device according to claim 33, wherein a data item is selected from a group including: a configuration, a file, a process, a service, a registry key, a registry value, a registry value within a remote computerized device.

45. The device according to claim 33, wherein the agentless module is adapted to initiate enforcement within the plurality of computerized devices, and wherein the initiation of the enforcement within the plurality of computerized devices is insensitive to a new attachment to the network of any one of the plurality of computerized devices.

46. The device according to claim 33, wherein the agentless module is adapted to automatically initiate enforcement within said computerized devices in response to one or more of the following: a completion of a previous enforcement, an event occurring within a computerized device connected to the network, a predefined schedule.

47. A non-transitory computer readable storage device, encoding the instructions for performing the method according to claim 1.

48. The device according to claim 1, wherein the designated data items and corresponding actions are either stored in a database on the computer implementing the enforcement policy, or they can be entered in by the operator.

49. The device according to claim 19, wherein the designated data items and corresponding actions are either stored in a database on the computer implementing the enforcement policy, or they can be entered in by the operator.

* * * * *